E. S. BRYANT & G. R. COULS.
SPRING SUSPENSION.
APPLICATION FILED SEPT. 11, 1913.
1,273,999.
Patented July 30, 1918.
2 SHEETS—SHEET 1.
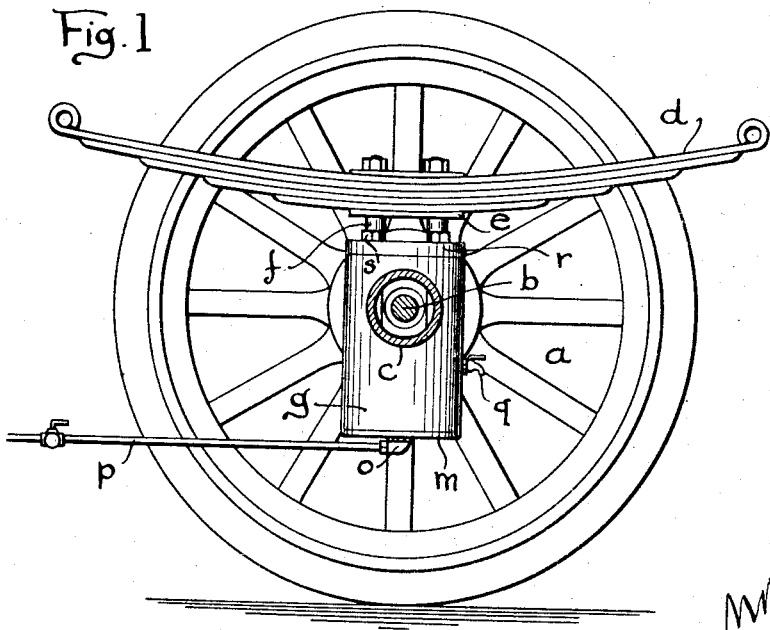
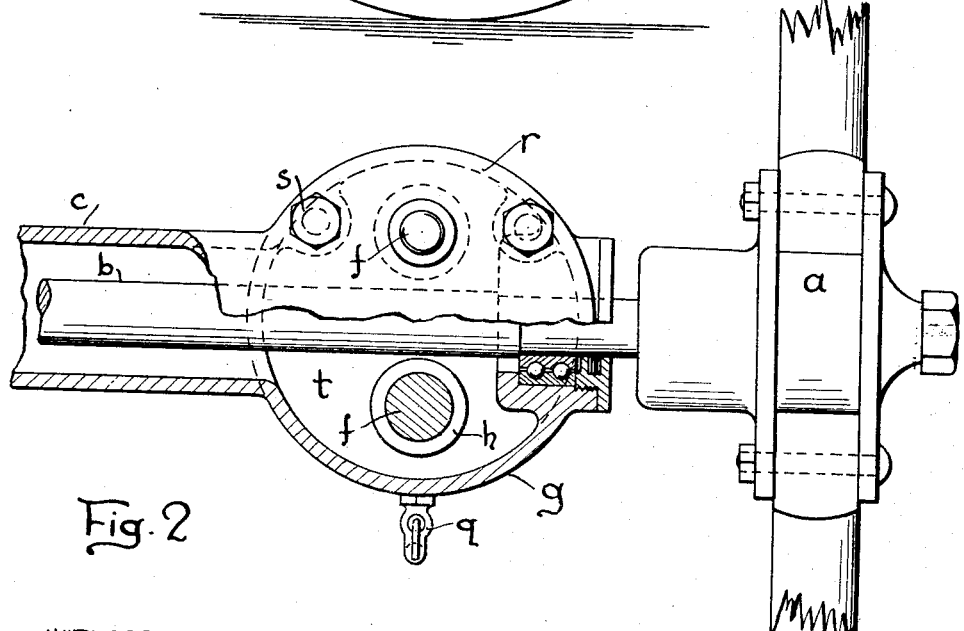

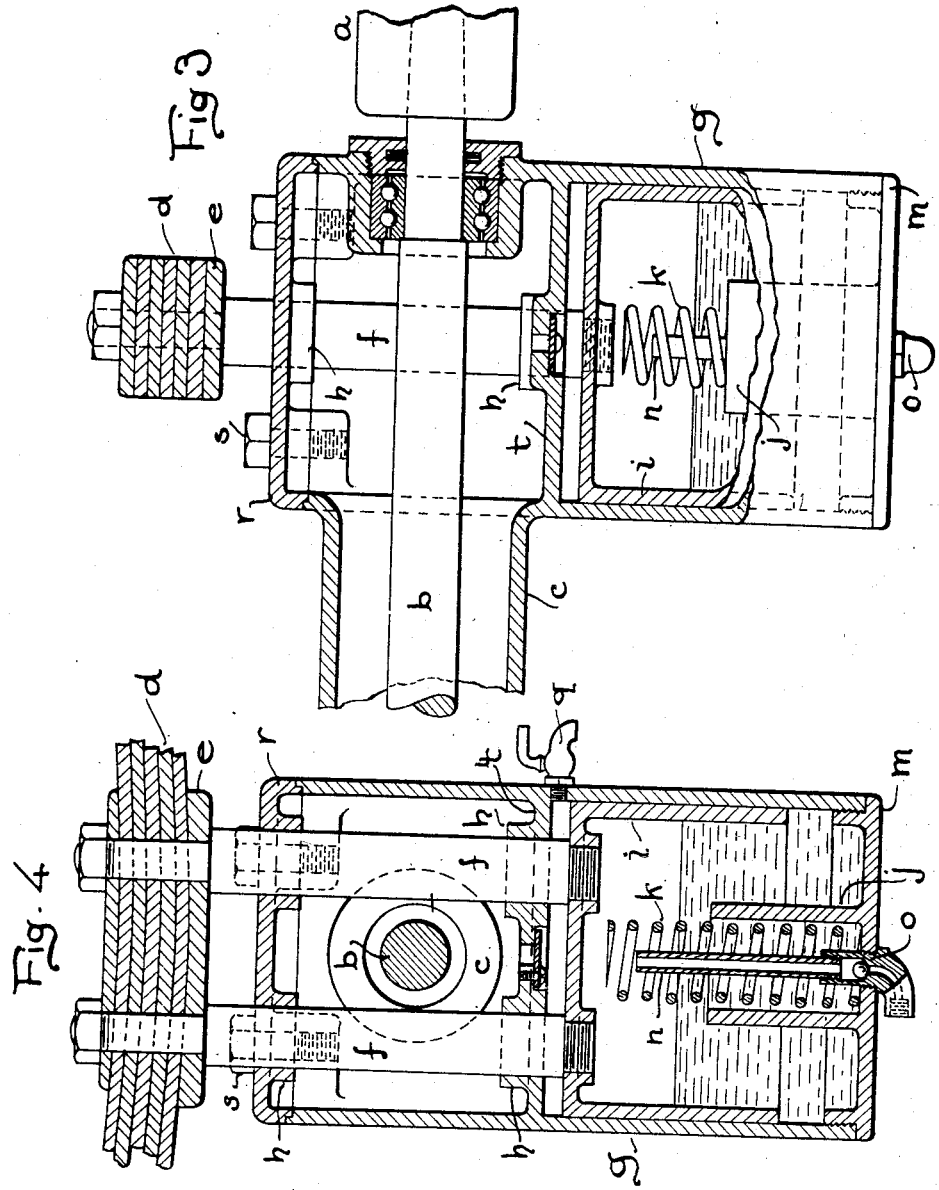

UNITED STATES PATENT OFFICE.

ELLSWORTH S. BRYANT AND GEORGE R. COULS, OF DETROIT, MICHIGAN.

SPRING SUSPENSION.

1,273,999. Specification of Letters Patent. Patented July 30, 1918.

Application filed September 11, 1913. Serial No. 789,227.

*To all whom it may concern:*

Be it known that we, ELLSWORTH S. BRYANT and GEORGE R. COULS, citizens of the United States, residing at Detroit, county of Wayne, State of Michigan, have invented a certain new and useful Improvement in Spring Suspensions, and declare the following to be a full, clear, and exact description of the same, such as will enable others skilled in the art to which it pertains to make and use the same, reference being had to the accompanying drawings, which form a part of this specification.

Our invention relates to spring suspension for vehicles, and a special object of our improvements is to provide an elastic connection between the springs and the axle of an automobile and particularly to provide a pneumatic support between the axle and vehicle.

In the accompanying drawings:

Figure 1, is an elevation of an apparatus embodying our invention with so much of the adjacent parts of an automobile as is necessary to show its connection therewith.

Fig. 2, is a plan view of the same partly broken away.

Fig. 3, is a detail elevation mostly in section showing the interior construction of the apparatus embodying our invention, the section being taken parallel with the axis of the vehicle axle.

Fig. 4, is a sectional view of the same, the section being at right angles to that of Fig. 3.

As the construction is the same on both sides of the automobile only the parts upon one side are shown and described.

$a$ represents one of the driving wheels of an automobile. $b$ is the driving shaft and $c$ is the casing, the shaft $b$ bearing in the casing $c$ in the usual way and constituting therewith the rear axle of the automobile. $d$ is one of the supporting springs. The spring $d$ is supported upon a bed-plate $e$.

$f\ f$ are two similar cylindrical rods, the upper parts of which are formed in bolts which act to secure the leaves of the spring together and to the bed-plate $e$. $g$, is a hollow cylindrical portion of the casing $c$, open at its upper and lower ends except when covered by the separable plates $r$ and $m$. $t$ is a partition in the cylinder $g$ adjacent to the lower part of the transverse portion of the casing $c$ and forming in connection with the plate $m$ and the walls of the casing between said plate and partition, a closed chamber inclosing the piston $i$. $h\ h$ are guides or bearings in the partition $t$ and upper cover, or closing plate $r$, in which guides the rods $f\ f$ fit and are adapted to reciprocate. The rods $f\ f$ are located on opposite sides of the shaft $b$ and at equal distances therefrom. $i$ is a hollow piston opening downward fitting and adapted to reciprocate in the lower portion of the cylinder $g$. The rods $f\ f$ are connected to the piston $i$ at their lower ends and form piston rods.

Oil, glycerin, or other fluid is forced into the cylinder $g$ and acts as a seal to the lower end of the piston $i$.

$j$, is a cylindrical cavity or socket concentric with the cylinder $g$ and rising from the lower closing plate or bottom $m$ of said cylinder. $k$ is a helical spring resting in the socket $j$ and extending upward a short distance below the closed upper end of the piston $i$. $n$ is a tube opening through the bottom plate $m$ and extending toward the top of the piston $i$ inside of said piston. $o$ is a non-return valve opening inward and located in the passage communicating with the tube $n$. $p$, (Fig. 1) is a pipe connecting with the tube $n$. The upper plate $r$ is secured in position by bolts $s$ and the lower plate $m$ is screwed into the lower end of the cylinder $g$ to close the same.

Air is forced in through the pipe $p$ and tube $n$ above the fluid in the cylinder $g$ and within the hollow of the piston $i$ so that said piston is supported by the air pressure therein and in turn, through the rods $f\ f$, supports the spring $d$ and the weight of the vehicle thereon.

$q$, is a drain cock opening from the cylinder $g$ above the piston $i$.

Should the pressure of air be insufficient at any time, the piston $i$ will be supported by the spring $k$, but under the ordinary conditions the pressure of the air is sufficient to hold the piston $i$ above and out of contact with said spring.

The partition $t$ is provided with an inwardly opening check valve so that oil may be admitted through the port of said valve below said partition and above the piston $i$ to form a check to cushion the upward movement of the piston by means of the air above said piston and the oil thereon. Should any air leak out from the cylinder it will be replaced by air drawn past the check valve.

What we claim is:

The combination with a vehicle, of a vertical cylinder supported by the axle of said vehicle, said cylinder having its upper and lower ends closed, a hollow piston opening downward, fitting and adapted to reciprocate in said cylinder, a rod extending from said piston through the upper end of said cylinder, a fluid seal for the lower end of said piston, and an inwardly opening check valve in the upper end of said cylinder, the port of said valve opening through the upper end of said cylinder and being adapted to permit the passage therethrough of air or liquid, a casing surrounding the outer end of the port of said valve and movable parts journaled in said casing.

In testimony whereof we sign this specification in presence of two witnesses.

ELLSWORTH S. BRYANT.
GEORGE R. COULS.

Witnesses:
VIRGINIA C. SPRATT,
ELLIOTT J. STODDARD.